United States Patent
Brick et al.

(10) Patent No.: US 9,488,769 B2
(45) Date of Patent: Nov. 8, 2016

(54) SURFACE LIGHT GUIDE AND PLANAR EMITTER

(75) Inventors: Peter Brick, Regensburg (DE); Joachim Frank, Coburg (DE); Stephan Kaiser, Regensburg (DE); Gerhard Kuhn, Köfering (DE); Ales Markytan, Regensburg (DE); Julius Muschaweck, Gauting (DE); Christian Neugirg, Regensburg (DE)

(73) Assignee: OSRAM Opto Semiconductors GmbH (DE)

( * ) Notice: Subject to any disclaimer, the term of this patent is extended or adjusted under 35 U.S.C. 154(b) by 364 days.

(21) Appl. No.: 13/642,924

(22) PCT Filed: Mar. 23, 2011

(86) PCT No.: PCT/EP2011/054467
§ 371 (c)(1),
(2), (4) Date: Dec. 21, 2012

(87) PCT Pub. No.: WO2011/131447
PCT Pub. Date: Oct. 27, 2011

(65) Prior Publication Data
US 2013/0250610 A1 Sep. 26, 2013

(30) Foreign Application Priority Data
Apr. 23, 2010 (DE) .................. 10 2010 018 034

(51) Int. Cl.
G02B 6/10 (2006.01)
F21V 8/00 (2006.01)

(52) U.S. Cl.
CPC ............. *G02B 6/0035* (2013.01); *G02B 6/004* (2013.01); *G02B 6/0041* (2013.01); *G02B 6/0055* (2013.01); *G02B 6/0063* (2013.01)

(58) Field of Classification Search
CPC G02B 6/0035; G02B 6/0063; G02B 6/0055; G02B 6/0041; G02B 6/004; G02B 6/0026; G02B 6/0043; G02B 5/0825; G02B 5/0294; G02B 5/0278; G02B 5/0252; G02B 5/0242; G02B 5/0236; G02B 5/021; G02B 5/205; G02B 5/1861
USPC ....... 362/607, 610, 615, 617–619, 627, 606, 362/621–625; 359/590, 584
See application file for complete search history.

(56) References Cited

U.S. PATENT DOCUMENTS 6,208,446 B1 * 3/2001 Faifman ...................... 398/136
6,208,466 B1 3/2001 Liu et al.
(Continued)

FOREIGN PATENT DOCUMENTS

DE 39 10 520 A1 10/1990
DE 44 32 515 A1 3/1996
DE 297 13 114 U1 1/1999

*Primary Examiner* — Laura Tso
*Assistant Examiner* — Naomi M Wolford
(74) *Attorney, Agent, or Firm* — DLA Piper LLP (US)

(57) ABSTRACT

A surface light guide includes a radiation exit area running along a main extension plane of the surface light guide and includes a light guiding region, which has scattering locations and a coating arranged on a first main area of the light guiding region, wherein radiation coupled in along the main extension plane impinging on the first main area after scattering at the scattering locations has an excessively increased radiation component and the coating reduces in a targeted manner an exit of the excessively increased radiation component from the radiation exit area.

21 Claims, 4 Drawing Sheets

(56) References Cited

U.S. PATENT DOCUMENTS

| | | | |
|---|---|---|---|
| 6,217,184 B1* | 4/2001 | Koike | G02B 6/0041 362/558 |
| 7,309,143 B2* | 12/2007 | Takata | 362/246 |
| 2003/0231483 A1* | 12/2003 | Higashiyama | 362/31 |
| 2006/0056166 A1 | 3/2006 | Yeo et al. | |
| 2006/0104093 A1* | 5/2006 | Feng et al. | 362/626 |
| 2006/0244877 A1* | 11/2006 | Noh et al. | 349/64 |
| 2007/0014127 A1 | 1/2007 | Hara et al. | |
| 2007/0064443 A1* | 3/2007 | Dunn | 362/612 |
| 2008/0158907 A1* | 7/2008 | Lin et al. | 362/606 |

* cited by examiner

SURFACE LIGHT GUIDE AND PLANAR EMITTER

RELATED APPLICATIONS

This is a §371 of International Application No. PCT/EP2011/054467, with an international filing date of Mar. 23, 2011 (WO 2011/131447 A1, published Oct. 27, 2011), which is based on German Patent Application No. 10 2010 018 034.3, filed Apr. 23, 2010, the subject matter of which is incorporated herein by reference.

TECHNICAL FIELD

This disclosure relates to a surface light guide and a planar emitter comprising at least one surface light guide.

BACKGROUND

Radiation sources, for example, light emitting diodes (LEDs), usually have a comparatively small radiation exit area. The radiation generated by the radiation source can be coupled into a diffusor plate to enlarge the radiation exit area. However, this can lead to a comparatively inhomogeneous luminance on the radiation exit area, in particular with regard to the color locus and the emission angle.

It could therefore be helpful to provide a large-area emission with at the same time high homogeneity.

SUMMARY

We provide a surface light guide including a radiation exit area running along a main extension plane of the surface light guide and including a light guiding region, which has scattering locations and a coating arranged on a first main area of the light guiding region, wherein radiation coupled in along the main extension plane impinging on the first main area after scattering at the scattering locations has an excessively increased radiation component and the coating reduces in a targeted manner an exit of the excessively increased radiation component from the radiation exit area.

We also provide a planar emitter including at least one surface light guide and at least one radiation source, wherein the radiation coupled into the surface light guide during operation of the planar emitter is generated by the radiation source.

We further provide a surface light guide including a radiation exit area running along a main extension plane of the surface light guide and including a light guiding region, which has scattering locations and a coating arranged on a first main area of the light guiding region, wherein radiation coupled in along the main extension plane and impinging on the first main area after scattering at the scattering locations has an excessively increased radiation component and the coating reduces in a targeted manner an exit of the excessively increased radiation component from the radiation exit area; and wherein the excessively increased radiation component is an angle range and the coating has a reduced transmissivity in the angle range in comparison to a further angle range and an extent of the scattering locations is large relative to the wavelength of the radiation coupled into the surface light guide in the light guiding region; or the excessively increased radiation component is a wavelength range and the coating has a reduced transmissivity in the wavelength range by comparison to a further wavelength range and the scattering locations are small relative to the wavelength of the radiation coupled into the surface light guide in the light guiding region.

DETAILED DESCRIPTION

Figure 1:
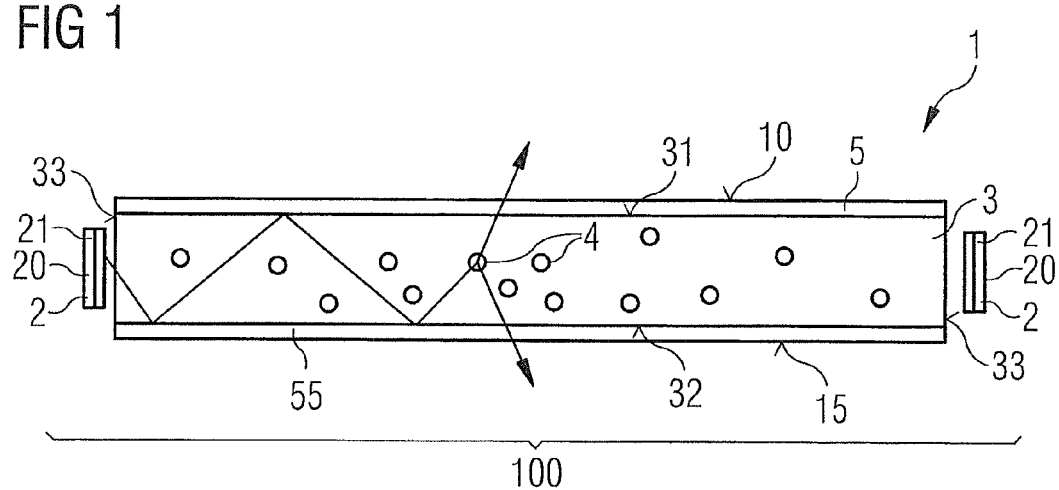
FIG. 1 shows a first example of a planar emitter including a surface light guide in schematic sectional view.

We provide a surface light guide that may comprise a radiation exit area running along a main extension plane of the surface light guide, and a light guiding region. The light guiding region has scattering locations and a coating arranged on a first main area of the light guiding region. Radiation that is coupled in along the main extension plane and impinges on the first main area after scattering at the scattering locations has an excessively increased radiation component. The coating reduces in a targeted manner an exit of the excessively increased radiation component from the radiation exit area.

An excessively increased radiation component is understood to mean, in particular, a component of the radiation which, in the case of complete or at least substantially complete coupling-out from the radiation exit area, would lead to an emission characteristic, for instance relative to the spectral and/or angle-dependent emission, that deviates from an emission characteristic predefined for the surface light guide, for example, a homogeneous emission characteristic.

In other words, undesirable radiation components, for example, those radiation components which could cause an inhomogeneous emission of the surface light guide, may be reduced by the coating such that the overall coupled-out radiation has a high homogeneity. With the coating, therefore, homogeneity of the luminance of the emerging radiation is increased in comparison to a surface light guide without such a coating.

In this case, homogeneity relates, in particular, to the luminance distribution on the radiation exit area, to the luminance distribution depending on the angle of the emitted radiation and/or to the luminance distribution depending on the wavelength for different points on the radiation exit area.

As a measure of the color homogeneity, for two arbitrary points on the radiation exit area it is possible to plot the color locus for a predefined angle in a chromaticity diagram (CIE diagram). Preferably, the points lie within a 5-step McAdam ellipse, particularly preferably within a 3-step McAdam ellipse.

A targeted reduction is understood to mean, in particular, that the reduction, for instance by reflection, is provided to influence luminance of the radiation emerging from the radiation exit area. In contrast, a merely manufacturingdictated residual absorption of a layer embodied in radiation-transmissive fashion is not regarded as targeted reduction.

The excessively increased radiation component may be an angle range. The coating preferably has a reduced transmissivity in this angle range in comparison to a further angle range.

In this case, an extent of the scattering locations is preferably large relative to the wavelength of the radiation coupled into the surface light guide in the light guiding region, for example, at least five times the magnitude of a peak wavelength of the coupled-in radiation, wherein the wavelength here relates to the wavelength in the material.

A scattering at scattering locations of this type has, in the visible spectral range, only a comparatively small dependence on the wavelength of the scattered radiation. Therefore, homogeneity of the color locus of the emerging radiation may be obtained by such scattering locations.

Furthermore, the scattering at such scattering locations brings about on average only comparatively small changes in the propagation direction of the radiation and is therefore also designated as forward scattering. This may have the effect that a comparatively large proportion of the radiation propagating in the light guiding region runs at comparatively large impingement angles with respect to normal to the surface light guide even after the scattering at scattering locations. Large impingement angles are, in particular, such angles at which the radiation impinges on the first main area of the surface light guide only just below the critical angle of total internal reflection. In the absence of the coating, this radiation component leads to an excessively increased radiation component which emerges from the radiation exit area at large angles of emergence, for example, angles of 50° or more with respect to normal to the surface light guide, which results in a reduction of homogeneity of the luminance relative to the emission angle.

In other words, the coating increases the proportion of radiation which impinges on the first main area at an angle close to the critical angle of total internal reflection and reflected back into the light guiding region. After a further scattering at a scattering location, the radiation may emerge from the radiation exit area of the surface light guide at a smaller angle. With the coating, therefore, in comparison to an untreated light guide/air interface, homogeneity of the emission with regard to the angle distribution may be increased. A large-area and at the same time homogeneous emission is thus realized.

Alternatively or supplementarily, the excessively increased radiation component may be a wavelength range, for example, radiation in the blue spectral range. The coating preferably has a reduced transmissivity in this wavelength range in comparison to a further wavelength range, for example, on account of an increased reflectivity.

In this case, the extent is preferably small relative to the wavelength of the radiation circulating in the light guiding region, for example, at least five times smaller than a peak wavelength of the radiation in the light guiding region. Predominantly Rayleigh scattering occurs at such scattering locations.

Rayleigh scattering is distinguished by a very wide scattering angle distribution such that large scattering angles through to backscattering also occur. A homogeneous luminance distribution relative to the emission angle may thus be obtained in a simplified manner.

Furthermore, in the case of Rayleigh scattering, the scattering effect is proportional to the fourth power of the frequency of the radiation. Radiation in the blue spectral range is therefore scattered at the scattering locations with a higher efficiency than radiation in the red spectral range. In the absence of the coating, this has the effect that a larger proportion of radiation in the blue spectral range than radiation in the red spectral range is coupled out from the surface light guide.

The coating may therefore compensate for a wavelength-dependent scattering effect of the scattering locations.

Scattering locations are understood generally to be locations in the light guiding region at which refractive index inhomogeneities may bring about a scattering of the impinging radiation. Preferably, the scattering locations are formed by particles, for example, diffusor particles. The particles may be solid or hollow, for instance air-filled particles.

Alternatively or supplementarily, the scattering locations may be formed by cavities or defects in the light guiding region.

Cavities or defects in the light guiding region may be produced thermally and/or optically, for example, by targeted local heating of the light guiding region, for instance, by laser radiation.

Further preferably, a reflector layer is formed on that side of the light guiding region which faces away from the radiation exit area.

The reflector layer may exhibit broadband reflection in particular for the radiation propagating in the light guiding region. Preferably, the reflector layer contains a metal or a metallic alloy or consists of such a material. With the reflector layer, an increased proportion of the coupled-in radiation can be coupled out on the part of the radiation exit area such that the radiation emerges from the surface light guide completely or at least predominantly on one side.

The reflector layer is preferably spaced apart from the light guiding region. Thus, only that radiation component which has already emerged from the light guiding region is deflected at the reflector layer in the direction of the radiation exit area. For radiation components that do not emerge, in contrast, total internal reflection free of losses may take place. In a departure from that, the reflector layer may also directly adjoin the light guiding region.

Further preferably, the surface light guide is transparent in the switched-off state. In this context, transparency is understood to mean that the sum of specular reflection and specular transmission is as close as possible to the value of 100% that may be achieved theoretically for the case of absorption and scattering losses being totally absent. Preferably, the transparency is at least 60%, particularly preferably at least 80%.

Still further preferably, a further coating is formed on a second main area of the light guiding region, the second main area lying opposite the first main area. The further coating may comprise, in particular, at least one of the features described in connection with the coating, wherein the coating and the further coating may be identical or different from one another.

Alternatively or supplementarily, the further coating may also be highly reflective to at least one wavelength range. The higher the reflectivity of the further coating, the more efficiently the radiation may be deflected in the direction of the radiation exit area.

Yet further preferably, a further radiation exit area is formed on the side of the surface light guide lying opposite the radiation exit area. The radiation may therefore also be coupled out from the surface light guide on both sides.

Preferably, radiation emerging from the further radiation exit area differs from radiation emerging from the radiation exit area with regard to intensity and/or color locus. By way of example, the surface light guide may be configured such that light that appears warm-white emerges through the radiation exit area and light that appears cold-white emerges through the further radiation exit area, or vice versa.

The coating is preferably a multilayered dielectric coating. In particular, dielectric materials having a high transmissivity for the radiation propagating in the light guiding region are suitable.

With dielectric layer sequences, different transmission and/or reflection properties, for instance spectral or angle-dependent transmission or reflection properties, may be achieved in a simple and efficient manner.

Alternatively or supplementarily, the coating may contain a phosphorescent material and/or an electrochromic material. Such materials have different absorption properties in a reduced state and in an oxidized state. Since such materials are typically absorbent in the visible spectral range, use of such materials is expedient, in particular, for surface light guides with respect to whose transparency in the switched-off state less stringent requirements are made.

Preferably, the reflector layer is structured along the main extension plane of the surface light guide. A structure size of the structuring of the reflector layer is preferably below the resolving power of the human eye. The structuring may be formed, for example, by cutouts in the reflector layer. The average reflectivity of the reflector layer as perceived by the human eye is thus adjustable by varying the area proportion of the total area of the reflector layer that is made up by the cutouts.

The surface light guide described is particularly suitable for a planar emitter comprising at least one surface light guide and at least one radiation source, wherein the radiation coupled into the surface light guide during the operation of the planar emitter is generated by the radiation source.

The radiation source preferably comprises at least one semiconductor body having in each case at least one active region provided to generate radiation. In particular, a luminescence diode, for example, an LED, is suitable as a radiation source.

Further features, configurations and expediencies will become apparent from the following description of selected examples in conjunction with the figures.

Elements that are identical, of identical type or act identically are provided with the same reference symbols in the figures.

The figures and the size relationships of the elements illustrated in the figures among one another should not be regarded as to scale. Rather, individual elements may be illustrated with an exaggerated size to enable better illustration and/or to afford a better understanding.

A first example of a surface light guide is illustrated schematically in sectional view in FIG. 1. The planar emitter comprises a surface light guide 1, the radiation exit area 10 of which runs along a main extension plane of the surface light guide. Side areas 33 running perpendicular to the radiation exit area 10 delimit the surface light guide in the main extension plane.

The planar emitter 100 furthermore comprises a respective radiation source 2 on both sides of the surface light guide 1. The radiation sources 2 in each case serve as a primary radiation source, wherein the radiation exit area 10 of the surface light guide 1 serves for large-area emission. The radiation exit area 10 is larger than the sum of the areas from which the radiation emerges directly from the radiation sources.

In this example, the radiation source is a luminescence diode comprising a semiconductor body 20 having an active region 21 provided to generate radiation. The radiation source 2 may also comprise more than one semiconductor body, for example, a linear or matrix-type arrangement of a plurality of semiconductor bodies 20. In a departure from that, it is also possible to use some other radiation source, for example, a gas discharge lamp.

Radiation generated by the radiation source 2 during operation is coupled into the surface light guide 1 through the side areas 33 along the main extension plane of the surface light guide. The radiation exit area 10 is large relative to the side area 33 such that a large-area emission of the coupled-in radiation is effected. The surface light guide 1 comprises a light guiding region 3, which extends in a vertical direction, that is to say perpendicular to the main extension plane, between a first main area 31 and a second main area 32.

A coating 5 is arranged on the first main area 31. Scattering locations 4 are formed in the light guide, at which scattering locations the radiation propagating in the light guiding region 3 is scattered.

The interaction of scattering locations 4 and coating 5 will be explained in greater detail in connection with FIGS. 5A to 5C.

Preferably, the coating 5 and the scattering locations 4 are coordinated with one another such that the color locus of the radiation emerging from the radiation exit area is homogeneous. For two arbitrary points on the radiation exit area and for a predefined angle, the color loci in the chromaticity diagram (CIE diagram) preferably lie within a 5-step McAdam ellipse, particularly preferably within a 3-step McAdam ellipse.

A planar emitter 100 having a large-area and at the same time homogeneous emission is thus realized.

A further radiation exit area 15 is formed on the side of the surface light guide 1 lying opposite the radiation exit area 10. The radiation may therefore emerge from both sides of the surface light guide.

A further coating 55 is formed on the second main area 32 of the light guiding region 3.

The coating 5 and the further coating 55 may be of identical type.

In a departure from that, the coatings 5, 55 may also be different from one another such that radiation emerging from the radiation exit area 10 and radiation emerging from the further radiation exit area 15 differ with regard to the intensity and/or the color locus of the radiation emerging from the radiation exit area.

By way of example, the coatings may be arranged such that light that appears warm-white to the human eye emerges from the radiation exit area 10 and light that appears cold-white emerges from the radiation exit area 15.

The surface light guide 1 is preferably transparent in the switched-off state. Preferably, the transparency is at least 60%, particularly preferably at least 80%.

The surface light guide 1, more particularly the light guiding region 3, preferably contains a glass or a plastic, for example, polymethyl methacrylate (PMMA), polycarbonate (PC) or polyurethane (PU).

To clarify the functional principle, FIG. 1 shows a possible beam path of the radiation coupled into the surface light guide 1. After being coupled in, the radiation impinges on the first main area 31 and the second main area 32 in each case at an angle that is greater than the critical angle of total internal reflection, and so the radiation is in each case subjected to total internal reflection at the main areas.

After impinging on a scattering location, the radiation is deflected into an angle that is less than the angle of total internal reflection, and so the radiation may emerge on both sides of the surface light guide.

In a departure from the example described, coupling-in only on one side or coupling-in on more than two side areas into the surface light guide 1 may also be expedient.

Figure 2:
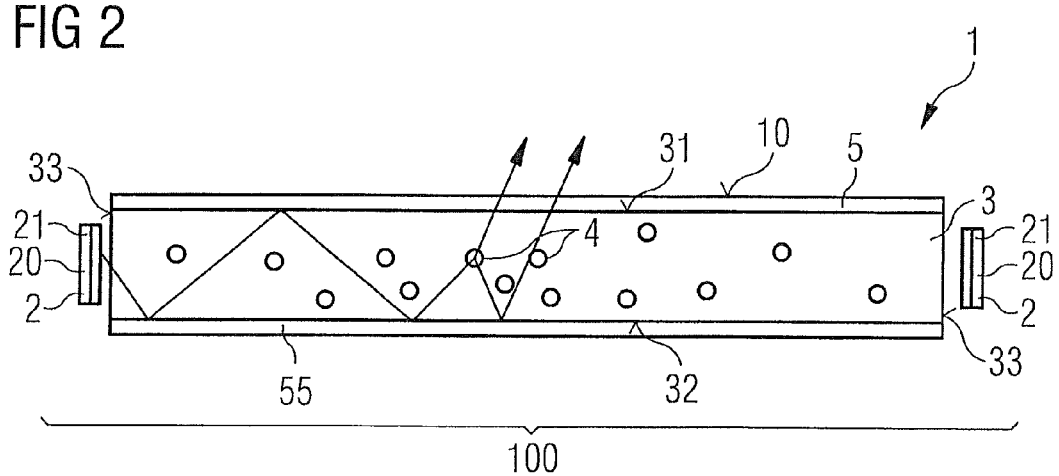
FIG. 2 shows a second example of a planar emitter including a surface light guide in schematic sectional view.

The second example illustrated in schematic sectional view in FIG. 2 substantially corresponds to the first example described in connection with FIG. 1. It differs therefrom in that the further coating 55 is embodied as highly reflective, for example, with a reflectivity of at least 80%, for at least one wavelength range. In this example, the radiation emerges from the surface light guide only on one side, through the radiation exit area 10. In a departure from that, the further coating may also be only partly reflective, with the result that a proportion of the radiation that is adjustable by the reflectivity also passes through the further coating 55.

Figure 3:
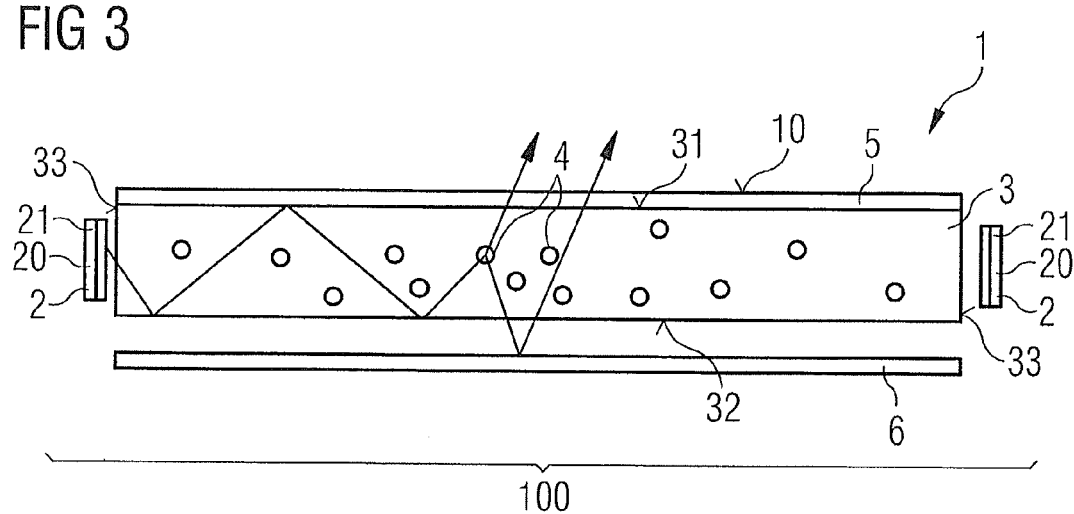
FIG. 3 shows a third example of a planar example including a surface light guide in schematic sectional view.

The third example of a planar emitter 100 comprising a surface light guide 1 as illustrated in FIG. 3 substantially corresponds to the first example described in connection with FIG. 1. In contrast thereto, the surface light guide 1 has a coating 5 only on the first main area 31. A reflector layer 6 is formed on the side lying opposite the first main area 31. The reflector layer is formed in a manner spaced apart from the surface light guide. In this case, although the radiation may emerge from the light guiding region 3, it is reflected at the reflector layer 6 in the direction of the radiation exit area 10 and emerges through the latter after further passage through the light guiding region 3.

The reflector layer 6 preferably contains a metal or a metallic alloy or consists of such a material. By way of example, aluminum, silver and rhodium are distinguished by a broadband, high reflectivity in the visible spectral range. The reflector layer may be present, for example, in the form of a prefabricated film or plate.

In a departure from the example described, a further coating may be formed even when the reflector layer 6 is used on the second main area 32, which further coating may be embodied, in particular, in the manner described in connection with FIG. 1.

Figure 4:
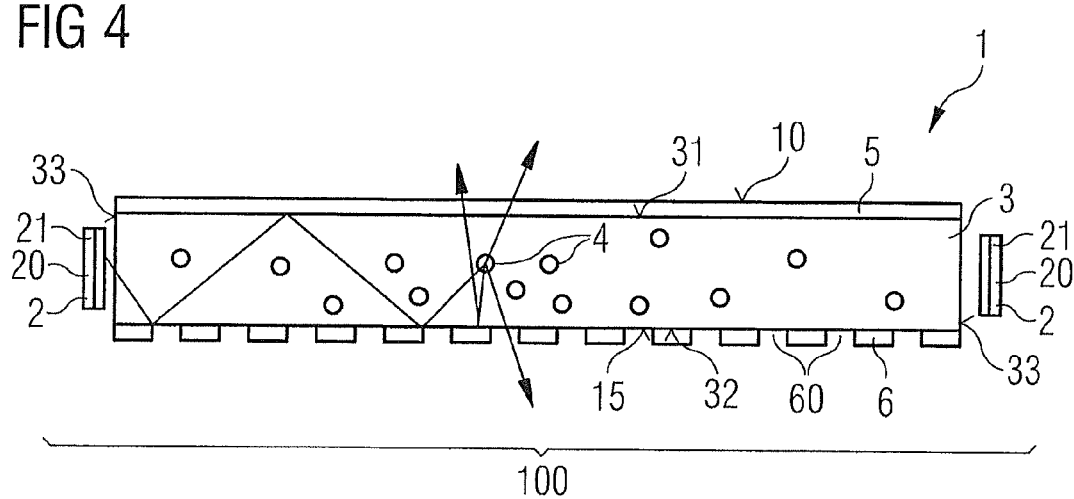
FIG. 4 shows a fourth example of a planar emitter including a surface light guide in schematic sectional view.

The fourth example illustrated in FIG. 4 substantially corresponds to the second example described in connection with FIG. 2. In contrast thereto, a reflector layer 6 is arranged on the second main area 32 of the light guiding region 3, the reflector layer being structured. The reflector layer may be a reflective film, for example, in which partial regions are removed, for example, by stamping-out to form cutouts 60.

Alternatively, the reflector layer 6 may also be a coating in which partial regions are selectively removed, for example, by a photolithographic patterning method.

A structure size of the structuring is preferably below the resolving power of the human eye. By way of example, structure sizes of less than 30 µm may no longer be resolved individually by the human eye from a distance of 10 cm. The human eye thus perceives the reflector layer as a layer having an averaged reflectivity, the reflectivity of which is adjustable by way of the ratio of the total area of the cutouts to the total area of the reflector layer.

In a departure from the example described, such a structuring may also be used for a, more particularly dielectric, coating. Consequently, the same film or the same layer structure of a coating may be used for desired different reflectivities, wherein the reflectivity may subsequently be set to the desired value by means of the structuring.

Figure 5A:
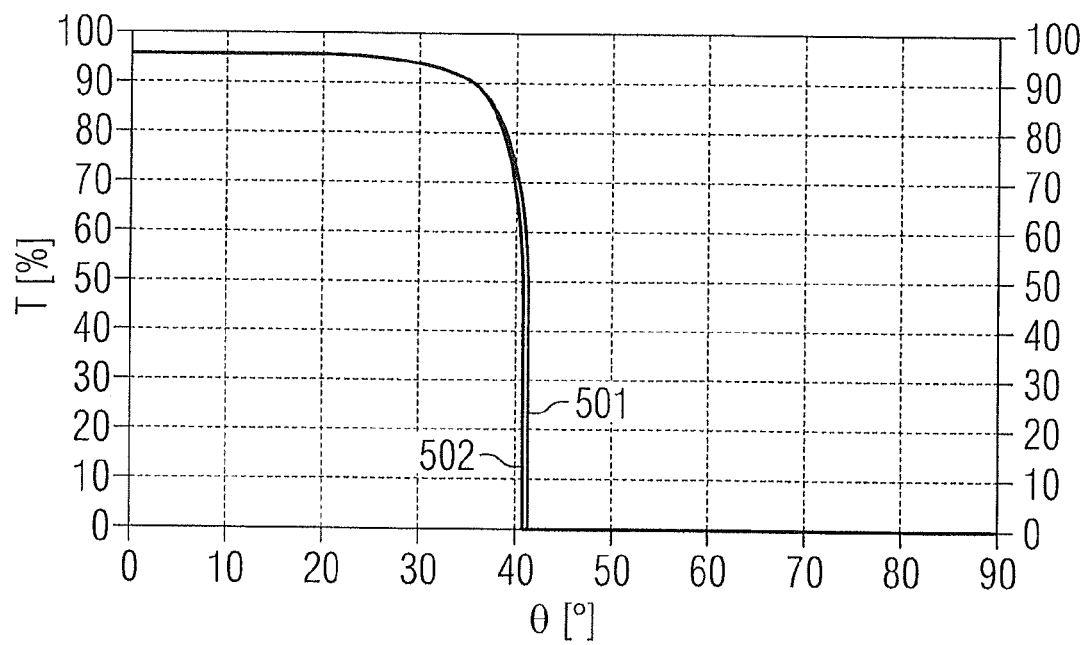
FIGS. 5A to 5C, respectively, show a profile of the percentage transmission for radiation having different wavelengths as a function of the impingement angle $\theta$ for a conventional light guide including a glass/air interface (FIG. 5A), a surface light guide including a coating in accordance with a first example (FIG. 5B) and a second example (FIG. 5C).
Figure 5B:
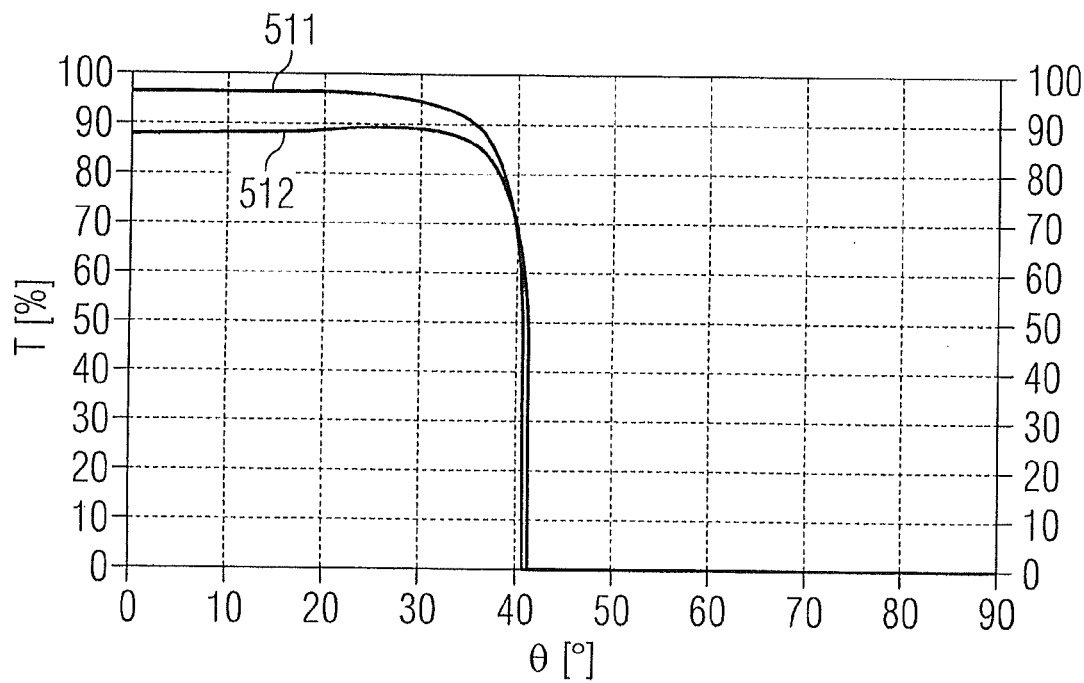
Figure 5C:
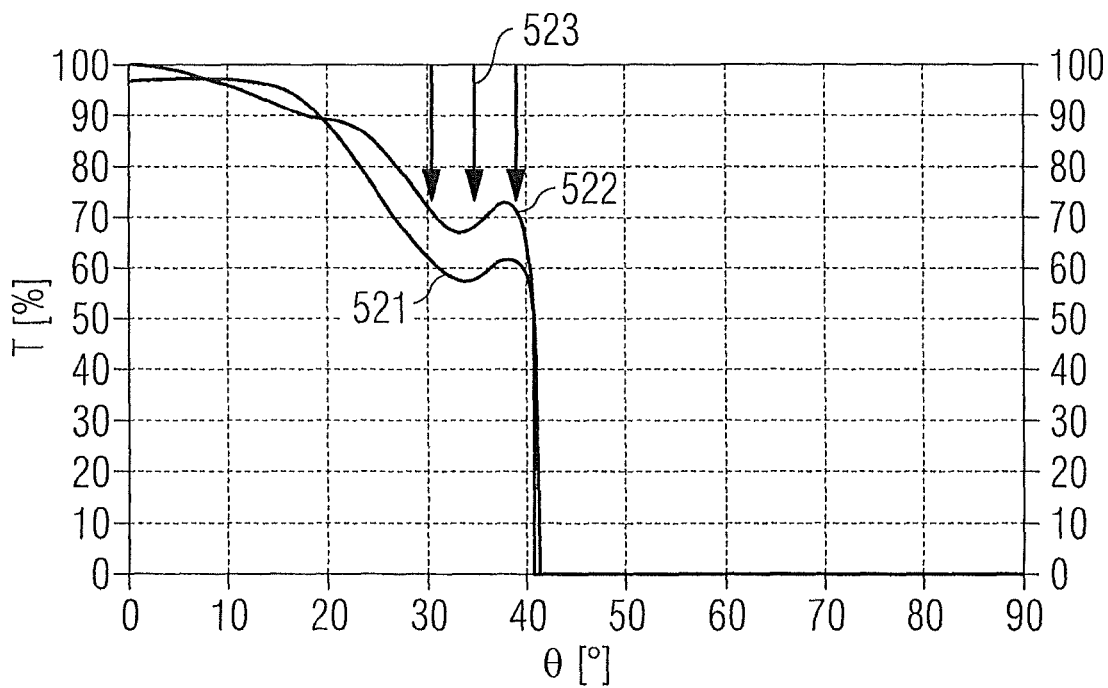

FIGS. 5A to 5C illustrate simulation results for the percentage transmission T as a function of an impingement angle θ relative to the normal to the main extension plane of the light guiding region. The curves 501, 511 and 521 respectively show the simulation results for red radiation having a vacuum wavelength of 625 nm. The curves 502, 512 and 522 respectively relate to blue radiation having a vacuum wavelength of 460 nm.

FIG. 5A shows a profile of the transmission for an untreated glass/air interface. The transmission has only very little wavelength dependence and is approximately 96% at angles of between 0° and approximately 25°. The transmission decreases for larger angles and is 0% for angles above a critical angle of total internal reflection of approximately 42°.

In comparison therewith, FIG. 5B shows a first example of a coating of a surface light guide wherein the transmission has a significantly increased wavelength dependence. In the case of perpendicular impingement (θ=0), the transmission is approximately 97% for radiation in the red spectral range and approximately 88% for radiation in the blue spectral range. In this case, the transmission is greater for the radiation in the red spectral range than for radiation in the blue spectral range over the entire angle range. With the coating, therefore, the red radiation component of the radiation emerging from the surface light guide may be increased in a targeted manner relative to the blue spectral component. The coating therefore reduces in a targeted manner the radiation coupling-out for the radiation in the blue spectral range.

A coating of this type is suitable, in particular, for surface light guides wherein the scattering at scattering locations 4 is such that, for blue radiation, it leads to a more effective scattering into comparatively small angles with respect to the normal to the surface light guide. In this case, the extent of the scattering locations 4 is comparatively small relative to the wavelength of the radiation propagating in the light guiding region 3.

This criterion is satisfied, in particular, if a peak wavelength in the surface light guide is at least five times the magnitude of the extent of the scattering locations such that predominantly Rayleigh scattering occurs. The latter has a larger scattering cross section for high-frequency radiation, that is to say radiation having a short wavelength.

Therefore, the color inhomogeneity of the surface light guide that occurs on account of the wavelength-dependent Rayleigh scattering may be compensated for by the coating.

The simulation shown in FIG. 5B is based on a coating 5 comprising three layers composed of tantalum pentoxide ($Ta_2O_5$) having a thickness of 21.43 nm in each case, wherein a silicon oxide layer ($SiO_2$) having a thickness of 44.58 nm in each case is respectively arranged in each case between these three layers. However, a comparable wavelength dependence of the coating may also be achieved with layer sequences whose materials and/or layer thicknesses deviate therefrom.

Suitable materials for the coating 5 include, in particular, dielectric materials that are transparent in the visible spectral range. By way of example, the dielectric material may contain an oxide, for instance aluminum oxide, silicon oxide or tantalum pentoxide, a nitride, for instance silicon nitride, or an oxynitride, for instance silicon oxynitride.

FIG. 5C shows a second example of a coating wherein the coating has a transmission reduced in a targeted manner for angles close to the angle of total internal reflection by comparison with an untreated glass/air interface. This is clarified in FIG. 5C on the basis of the arrows 523.

The graphs 521 and 522 show that both for radiation in the red spectral range and for radiation in the blue spectral range, the transmission for angles of between approximately 20° and approximately 40° is significantly reduced in comparison to an untreated interface. With such a coating 5, the proportion of radiation that emerges from the surface light guide 1 at comparatively large angles, for example, of 50° or more, may be reduced in a targeted manner, while the radiation may pass through the coating practically unimpeded at small angles, for example, of 0° to 15°. In the switched-off state, the surface light guide 1 appears bluish or cyan-colored on account of the coating.

With such a coating 5, therefore, an emission of the surface light guide 1 at large angles may be reduced in a targeted manner. Such a surface light guide is suitable, for example, for a planar emitter provided for ceiling lighting. In the case of ceiling luminaires, radiation emerging at large angles leads to increased glare and is therefore undesirable.

Furthermore, a coating 5 of this type is suitable, in particular, to homogenize radiation emerging from the radiation exit area of a surface light guide wherein scattering locations are formed in the light guiding region and promote coupling-out of the radiation at comparatively large angles with respect to the normal to the main extension plane. This is the case, for example, when using scattering locations which have a comparatively large extent relative to the wavelength in the light guiding region, the scattering locations having an extent of, for example, at least five times the magnitude of the wavelength of the radiation in the light guiding region. Predominantly forward scattering occurs at such scattering locations, and so the radiation coupled into the light guiding region at comparatively large angles with respect to the normal to the main extension plane owing to the lateral coupling-in experiences only comparatively small angular changes during scattering. Therefore, an excessively increased proportion of the radiation emerges from the light guiding region in an angle range close to the critical angle of total internal reflection.

Using scattering locations having a comparatively large extent in conjunction with the coating described an emission which has a high homogeneity relative to the angle dependence may thus be achieved. At the same time, luminance may also be formed particularly homogeneously with regard to the wavelength of the emitted radiation since the scattering effect in the case of comparatively large particles has only little wavelength dependence.

The simulation illustrated in FIG. 5C is based on an alternating layer sequence of five tantalum pentoxide layers and four silicon oxide layers arranged there-between, wherein the layer thicknesses as seen from the glass interface have the following values: 130.71 nm, 182.86 nm, 211.15 nm, 35.37 nm, 120.05 nm, 155.14 nm, 154.10 nm, 185.23 nm and 133.85 nm.

The following refractive indices are taken as a basis in both examples for the coating:

glass: 1.51987; tantalum pentoxide 2.14318; silicon oxide: 1.46109.

The scattering locations 4 may be formed, for example, by particles embedded into the light guiding region. The particles may be hollow bodies, for example, air-filled particles, or in solid fashion. Alternatively or supplementarily, the scattering locations may also be formed of cavities or defects in the light guiding region. Scattering locations of this type may be formed, for example, by targeted local evaporation of material of the light guiding region, for instance by means of laser radiation.

Furthermore, the coating 5 may alternatively or supplementarily contain an electrochromic material. Such materials have a different color effect in the reduced state and in the oxidized state on account of different absorption properties. By way of example, polyaniline (reduced: colorless/oxidized: green), poly-o-phenylenediamine (colorless/reddish-brown), polythiophene (green/brown), poly-3-methylthiophene (red/blue), 3,4-polyethylenedioxythiophene (dark blue/light blue), polypyrrole (yellow/bluish violet) or 3,4-polyethylenedioxypyrrole (red/colorless) may be used. Since such materials are absorbent in the visible spectral range at least in one state, the use of such materials is expedient particularly for surface light guides for which the highest possible transparency is not required in the switched-off state.

Alternatively or supplementarily, a phosphorescent material may also be used for the surface light guide 1, the phosphorescent material being provided for the at least partial conversion of radiation from the radiation source 2. The phosphorescent material may be, for example, in the form of a coating, for example, of the side area 33, of the first main area 31, of the second main area 32 or of the radiation exit area 10. In the switched-off state, this may make the surface light guide 1 appear yellowish or greenish, for example, depending on the material used.

This disclosure is not restricted by the description on the basis of the examples. Rather, our surface light guide and planar emitters encompass any novel feature and also any combination of features, which in particular includes any combination of features in the appended claims, even if the feature or combination itself is not explicitly specified in the claims or the examples.

The invention claimed is:

1. A surface light guide comprising a radiation exit area running along a main extension plane of the surface light guide and comprising a light guiding region, which has scattering locations and a coating arranged on a first main area of the light guiding region, wherein
    radiation coupled in along the main extension plane impinges on the first main area after scattering at the scattering locations;
    an extent of the scattering locations is at least five times as large as a peak wavelength of the radiation in the light guiding region;
    the coating reduces transmission of radiation in a red spectral range and in a blue spectral range for angles of 20° to 40° compared to an untreated interface; and
    radiation impinging at an angle of 0° can pass through the coating virtually unimpeded.

2. The surface light guide according to claim 1, wherein the scattering locations are formed by at least one of particles, cavities and defects in the light guiding region.

3. The surface light guide according to claim 1, wherein a reflector layer is formed on a side of the light guiding region facing away from the radiation exit area.

4. The surface light guide according to claim 1, wherein a further coating is formed on a second main area of the light guiding region, said second main area lying opposite the first main area.

5. The surface light guide according to claim 4, wherein the further coating is highly reflective to at least one wavelength range.

6. The surface light guide according to claim 1, wherein a further radiation exit area is formed on a side of the surface light guide lying opposite the radiation exit area, wherein radiation emerging from the further radiation exit area differs from radiation emerging from the radiation exit area with regard to intensity or color locus.

7. The surface light guide according to claim 1, wherein the coating is a multilayered dielectric coating.

8. The surface light guide according to claim 1, wherein the coating contains a phosphorescent material or an electrochromic material.

9. The surface light guide according to claim 1, wherein the coating is structured along the main extension plane of the surface light guide, and a structure size of the coating is below the resolving power of the human eye.

10. A planar emitter comprising at least one surface light guide according to claim 1 and at least one radiation source, wherein the radiation coupled into the surface light guide during operation of the planar emitter is generated by the radiation source.

11. The planar emitter according to claim 10, wherein the radiation source comprises at least one semiconductor body having an active region provided to generate radiation.

12. The surface light guide according to claim 1, that appears blue or cyan-colored in a switched-off state.

13. A surface light guide comprising a radiation exit area running along a main extension plane of the surface light guide and comprising a light guiding region, which has scattering locations and a coating arranged on a first main area of the light guiding region, wherein
   radiation coupled in along the main extension plane impinges on the first main area after scattering at the scattering locations;
   an extent of the scattering locations is at least five times smaller than a peak wavelength of the radiation in the light guiding region;
   radiation in a blue spectral range is scattered at the scattering locations with a higher efficiency than radiation in a red spectral range; and
   a transmission of the coating is greater for the radiation in the red spectral range than for radiation in the blue spectral range.

14. The surface light guide according to claim 13, wherein the scattering locations are formed by at least one of particles, cavities and defects in the light guiding region.

15. The surface light guide according to claim 13, wherein a reflector layer is formed on a side of the light guiding region facing away from the radiation exit area.

16. The surface light guide according to claim 13, wherein a further coating is formed on a second main area of the light guiding region, said second main area lying opposite the first main area.

17. The surface light guide according to claim 13, wherein a further radiation exit area is formed on a side of the surface light guide lying opposite the radiation exit area, and radiation emerging from the further radiation exit area differs from radiation emerging from the radiation exit area regarding intensity or color locus.

18. The surface light guide according to claim 13, wherein the coating is a multilayered dielectric coating.

19. The surface light guide according to claim 13, wherein the coating contains at least one of a phosphorescent material or an electrochromic material.

20. The surface light guide according to claim 13, wherein the coating is structured along the main extension plane of the surface light guide, and a structure size of the coating is below the resolving power of the human eye.

21. A planar emitter comprising at least one surface light guide according to claim 13 and at least one radiation source, wherein the radiation coupled into the surface light guide during operation of the planar emitter is generated by the radiation source.

* * * * *